United States Patent
Vandergheynst et al.

(10) Patent No.: US 6,783,706 B1
(45) Date of Patent: Aug. 31, 2004

(54) METHOD FOR DRY PROCESS RECYCLING OF MIXED (U,PU)O$_2$ OXIDE NUCLEAR FUEL WASTE

(75) Inventors: Alain Vandergheynst, Dour (BE); Jean Van Vliet, Grimbergen (BE); Eduard Pelckmans, Kasterlee (BE)

(73) Assignee: Belgonucleaire SA, Brussels (BE)

( * ) Notice: Subject to any disclaimer, the term of this patent is extended or adjusted under 35 U.S.C. 154(b) by 0 days.

(21) Appl. No.: 09/889,881
(22) PCT Filed: Jan. 26, 1999
(86) PCT No.: PCT/BE99/00012
§ 371 (c)(1),
(2), (4) Date: Jul. 24, 2001
(87) PCT Pub. No.: WO00/45394
PCT Pub. Date: Aug. 3, 2000

(51) Int. Cl.$^7$ .......................... C04B 33/32; B29B 17/00; G21C 21/00
(52) U.S. Cl. ...................... 264/0.5; 264/37.1; 264/37.3; 264/653
(58) Field of Search ................................ 264/37.3, 0.5, 264/37.1, 653

(56) References Cited

U.S. PATENT DOCUMENTS 5,324,712 A * 6/1994 Su .............................. 505/492
5,607,297 A * 3/1997 Henley et al. ................. 432/99
5,841,200 A * 11/1998 Bauer et al. .................. 264/0.5

FOREIGN PATENT DOCUMENTS

| FR | 2 622 343 A1 | 4/1989 |
| FR | 2 720 540 A3 | 12/1995 |
| FR | 2 765 383 A1 | 12/1998 |
| GB | 1 397 014 | 6/1975 |

* cited by examiner

*Primary Examiner*—Christopher A. Fiorilla
(74) *Attorney, Agent, or Firm*—Sughrue Mion, PLLC

(57) ABSTRACT

A method for dry process recycling of mixed (U,Pu)O$_2$ oxide nuclear fuel waste, including a process for making fuel pellets of mixed (U,Pu)O$_2$ oxide, including a dosage and a first mixture (1) of waste in powder form and, if required, of PuO$_2$ and/or UO$_2$ powders, a micronization (2) and a forced sieving (3) of said first mixture, another dosage and a second mixture (4) of the first sieved mixture, of UO$_2$ powders and, if necessary, of the waste powder, pelletizing (6) the second mixture, and sintering (7) the resulting pellets; and a process for pre-treating the waste including pelletizing (20) and sintering (21) the powder waste to form waste pellets, and micronizing (23) the waste pellets to form the desired waste powder designed to be incorporated as waste powder, in the first (1) and/or second mixtures.

14 Claims, 2 Drawing Sheets

Process for manufacturing mixed oxide fuel

METHOD FOR DRY PROCESS RECYCLING OF MIXED (U,PU)O₂ OXIDE NUCLEAR FUEL WASTE

This application is a 371 of PCT/BE99/00012 filed Jan. 26, 1999.

The present invention relates to a process for dry recycling of $(U,Pu)O_2$ mixed-oxide nuclear fuel scraps.

The manufacture of fuel for light water reactors, based on uranium and plutonium oxide, generally called MOX fuel, has been the subject of various developments connected to the desire to recycle plutonium recovered during the reprocessing of spent fuel.

The manufacture and the irradiation of MOX fuel in light water reactors are now considered as a solution for giving acceptable resistance to the proliferation of plutonium separated from fission products, whether the plutonium is of civil or military origin.

Many processes for manufacturing MOX fuel have been developed during the last two decades, some calling for the complete milling of $UO_2$ and of $PuO_2$ powders in order to provide an intimate mixture, others being limited to milling only a fraction of these powders.

The MIMAS (Micronization and MASter blend) process, which was developed by the applicant of the present invention (see FIG. 1), carries out the micronization by milling only a fraction of the final blend and uses two successive blending operations to allow isotopic homogenization and to take advantage of the use of free-flowing $UO_2$ feed products. The use of free-flowing $UO_2$ in the second blend and the limitation of milling to the first blend alone simplify the manufacture (for example by avoiding prior compacting/granulation or spheroidizing operations on the mixed oxide blend) and have considerably simplified qualification of the MOX fuel by users and licensing by the nuclear safety authorities, at the start of its industrialization (by virtue of the similarity in behavior of this MOX fuel and of the $UO_2$ fuel).

While the mixed oxide fuel is being manufactured for light water reactors, large quantities of scraps are produced during development of the manufacturing process and continue to be produced during routine manufacture; these quantities of scrap are connected to the process itself, to the fuel user specifications, to the traceability of the products (batch production) and to monitoring their quality by sampling.

Processes for treatment of mixed oxide scraps by liquid routes are known. These processes have various considerable drawbacks: on the one hand, they generate considerable liquid effluents and additional criticality risks; on the other hand, they require additional packaging and transport in the frequent case where the liquid route treatment plant is not located on the same site as that of scrap production.

There is therefore a need to be able to directly dry-recycle manufacturing scraps of this type, at the location of their production, in the manufactured fuel.

In addition, experience has shown that dry recycling of scraps without particular precautions can lead to product defects during pellet manufacture namely excessive variability of the physical characteristics of the product, differential-shrinkage defects (for example connected to the direct recycling of the grinding powders), blister defects caused by volatile impurities, etc. Generally, the production of a product with controlled specifications involves controlling the characteristics of the input products.

In order to solve the drawbacks mentioned above, the recycling process of the invention comprises:

a process for manufacturing $(U,PU)O_2$ mixed oxide fuel pellets including:
  a dispensing and a first blending of scraps in powder form and, if required, of $PuO_2$ and/or $UO_2$ powders, micronization and forced sieving of said first blend,
  another dispensing and a second blending of the first sieved blend, of $UO_2$ powders and, if required, of scraps in powder form,
  pelletizing of the second blend, and
  sintering of the resulting pellets, and a process for pretreating scrap including:
  pelletizing and sintering of powder scraps in order to form scrap pellets, and
  micronization of the scrap pellets in order to form scrap powder designed to be incorporated as scraps in powder form into the first and/or second blends.

In this way, a process for dry-recycling the manufacturing scraps in the MOX fuel is obtained, and this process can deal with the integral quantity of scraps. This process can also be used to recycle $(U,Pu)O_2$ mixed oxide fuel scrapped due to shortage or discontinuation of its utilization.

According to one embodiment of the invention, scrap unsintered powders (for example, end-of-batch powders from pelletizing) and/or powders arising from grinding of fuel pellets are taken as powder scraps for the aforementioned pelletizing and sintering pretreatment.

According to one advantageous embodiment of the invention, up to 40% by mass of scrap, with respect to the net production of pellets, is incorporated into the aforementioned process for manufacturing fuel pellets.

Other details and particular features of the invention will emerge from the appended claims and the description of the process of the invention given below by way of nonlimiting example, with reference to the appended drawings.

In the various figures, the same references denote the same or similar elements.

Figure 1:
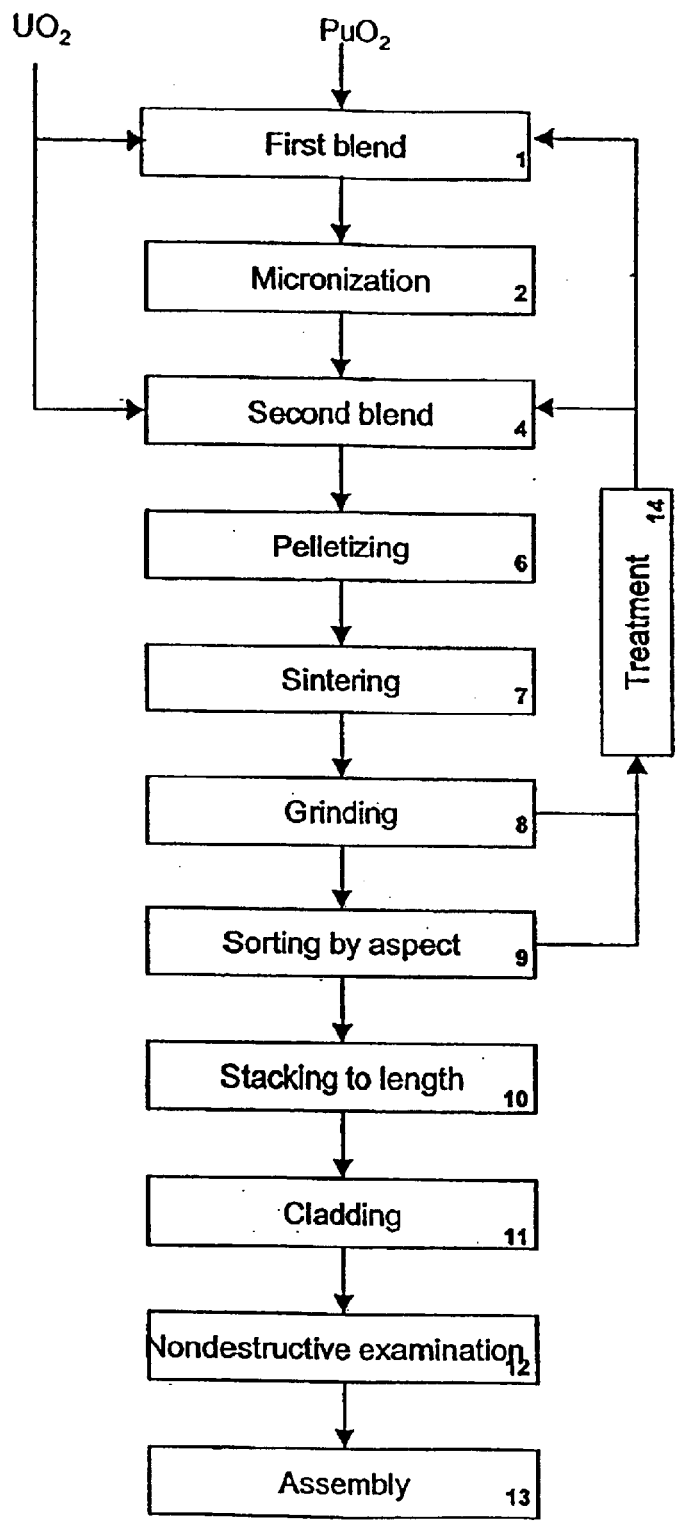
FIG. 1 shows schematically the steps in the manufacture of mixed oxide fuel, according to the MIMAS process.
Figure 2:
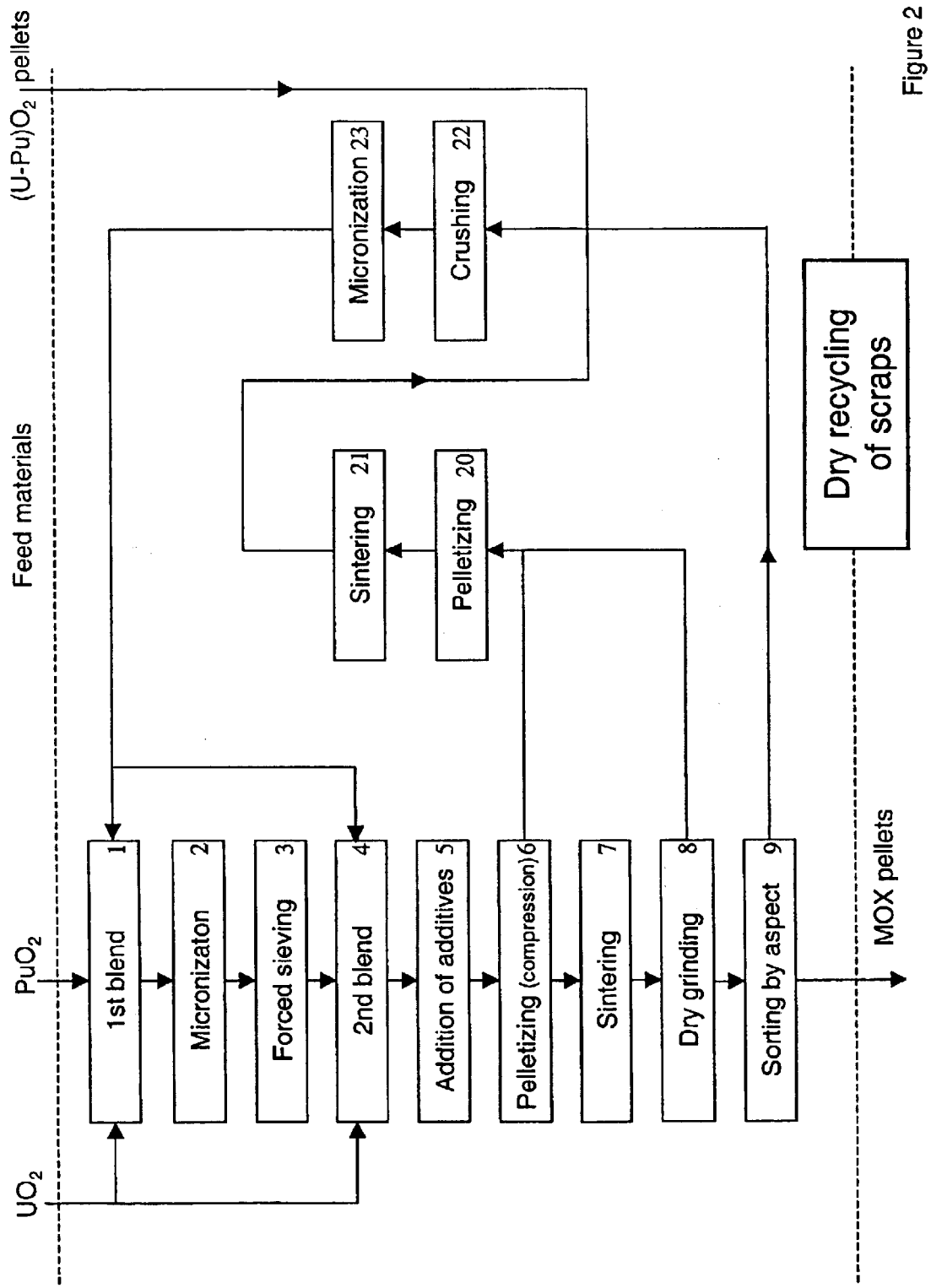
FIG. 2 shows schematically the steps of manufacturing mixed oxide fuel and those of dry recycling, according to the invention.

In order to prevent the aforementioned drawbacks, the process of the invention for dry recycling of $(U,Pu)O_2$ mixed oxide scraps is based on a process for manufacturing $(U,Pu)O_2$ mixed oxide fuel pellets, that is to say generally (FIGS. 1 and 2):

a dispensing and a first blending (step 1) of scraps in powder form and, if required, of $PuO_2$ and/or $UO_2$ powders, micronization (step 2) of this first blend, in particular by milling, and forced sieving (step 3) of its product, for example through a 250 μm mesh, sieve, another dispensing and a second blending (step 4) of the first sieved mixture, of $UO_2$ powders and, if required, of scrap in powder form, homogenization (step 5) of the second blend and addition of lubricants and/or porosity control agent(s), compression (step 6) of the second blend into pellets using presses (pelletizing) and sintering (step 7) of the resulting pellets, preferably under a wet argon and hydrogen atmosphere.

This process of manufacturing mixed oxide fuel pellets can ordinarily further comprise, for the pellets thus obtained, steps of dry grinding (step 8), sorting for aspect (step 9), stacking to length (step 10), loading the pellets in to the cladding and welding the cladding in the constitution of fuel rods (step 11), pressurizing the rods, nondestructive examination of the rods (step 12), and assembly of the rods (step 13).

According to the invention, said recycling process comprises, in addition, a scrap pretreatment process, comprising, amongst others, steps of pelletizing (step 20) and of sintering (step 21) powder scraps, arising in particular from the aforementioned manufacturing process of mixed oxide fuel pellets, in order to form scrap pellets, and of micronization (step 23) of the scrap pellets in order to form scrap powder intended to be incorporated as scrap in powder form in the first and/or second blends (in steps 1 and/or 4).

It will be noted that the recycling process described above does not comprise (a) prior compression/granulation (or spheroidizing) step(s) usually intended to improve the flowability of the final blend and to promote filling of the matrices at the pelletizing press. The reason for this is that such steps are superfluous for the invention, because of the choice of steps for the process of the invention and because of the order in which they occur for the products which are subjected to it.

Some parameters, which are not limiting, of the above pellet manufacturing process are given below by way of example:

working in batches and by campaign rather than continuously, plutonium content of the first blend: 20 to 40%, milling in 60 kg quantities for an actual minimum time of 5 hours, use of $UO_2$ powders originating from ADU or AUC (known to the person skilled in the art), addition of 0.2 to 0.5% zinc stearate and of 0 to 1% AZB pore-forming agent (known to the person skilled in the art), compression by a pressure between 400 and 600 MPa, sintering for a minimum of 4 hours at 1650–1760° C. in an argon environment with 5% hydrogen and an $H_2/H_2O$ ratio of 20 to 30, dry centerless grinding.

During these manufacturing operations, scraps can be produced, in the process of the manufacture itself, of up to 10 to 20% of the net production, this range depending on a few important variables such as a particular specification by the user of the process or by his client (visual defect specification, for example), the size of the manufacturing campaigns, etc.

To reduce the time taken by the micronization of the scrap pellets, the process may, in addition, comprise precrushing (step 22) thereof.

It is possible to use, in a nonlimiting manner, scrapped unsintered powders and/or powders arising from grinding (step 8) of fuel pellets as powder scrap for the aforementioned pelletizing and sintering (steps 20 and 21) of the pretreatment process.

With a view to limiting the investment in plant and in premises, it Is possible to use the aforementioned common fuel pellet manufacturing equipment, that is mills, compression presses, sintering furnaces, etc. for the scrap dry-preparation steps (steps 20 to 23), with a view to recycling. The adjustment parameters for the recycling may be identical or different to those of the actual manufacture of fuel pellets. Proceeding with the process in batches and campaigns makes it possible to insert the recycling operations between actual pellet manufacturing operations.

With regard to scrap dust and $PuO_2$ and $UO_2$ oxide dust produced during the process or transfer operations, it is possible to recover them by means of cleanable filters so as to recycle them into scrap pellets at the pelletizing and sintering steps (steps 20 and 21).

Advantageously, it is possible to incorporate up to 40% of pretreated scraps (in steps 20 to 23), with respect to the net production of fuel pellets, into the aforementioned manufacturing process thereof.

Experience has shown the applicant that it is possible to recycle, in balance with the actual manufacture, scrap produced in the manufacture, up to a percentage of 20 to 25% of the net production of these pellets.

In particular, a proportion of 99.5%, expressed as mass of $PuO_2$, of the scraps from the aforementioned process for manufacturing fuel pellets is dry-recycled.

The ability of the process of the invention to recycle large proportions of scrap can therefore be turned to advantage in order to recycle unusual proportions of scrap encountered, inter alia, during qualification tests of the process, during productions incidents, etc.

It is possible to incorporate into said first mixture up to 100% of scrip pretreated according to the invention, whether the scrap comes from the reference MOX pellet manufacturing process (MIMAS process) or from another process.

Preferably, a ball mill is used for the micronization of the aforementioned first blend (step 2) and/or of said scrap pellets (step 23).

During the sintering (step 7, 21), it is possible to adjust the partial pressure of oxygen $p_{O2}$, preferably by humidification, in order to improve the interdiffusion of the $PuO_2$ and $UO_2$ oxides.

The main types of scrap encountered in the art are summarized below, by way of example.

| Form | Origin | Characteristics before treatment | % scrap (In mass of $PuO_2$) |
| --- | --- | --- | --- |
| Powders | End of pellet-pelletizing batch | Unsintered powder with uncontrolled particle size distribution and sinterability | 99.5% |
| | Grinding powders | Sintered powder with uncontrolled particle size distribution and sinterability | |

-continued

| Form | Origin | Characteristics before treatment | % scrap (In mass of $PuO_2$) |
|---|---|---|---|
| | Recovery of dust | Uncontrolled $PuO_2$ and impurity content and particle size distribution | |
| Pellets | Rejects from sorting by aspect Samples Excess production | Sintered pellets | |
| Various | Chemical analyses Maintenance and cleaning of production equipment and/or gloveboxes | Nitric solutions Volatile chemical impurities | 0.5% |
| | | Nonvolatile chemical impurities | |

The steps of crushing (step 22) (optional) and of micronization (step 23) the pellets can be turned to advantage also for recycling scrapped pellets, for example on sorting (step 9), and for increasing the size of the batches of scrap powder homogenized and characterized before recycling.

It must be understood that the present invention is in no way limited to the embodiments described above and that many modifications maybe carried out thereon without departing from the scope of the claims given below.

For laboratory nitric solutions, it is possible to use precipitation and calcination before dry recycling as for the scrap mentioned above.

For scrap which exceptionally has excess nonvolatile chemical impurities, it is possible to use, for example, chemical pretreatment in an aqueous phase.

The process of recycling scrap according to the invention can also be turned to advantage in order to recycle, as raw materials, unirradiated pellets of $(U,Pu)O_2$ mixed-oxide nuclear fuel, possibly produced by different processes (for example, originating from the scrap of unirradiated mixed oxide fuels and intended for advanced reactors or research reactors).

What is claimed is:

1. A process for dry recycling of $(U,Pu)O_2$ mixed-oxide nuclear fuel scrap arising from the manufacture of fuel or from the scrapping of fuel as result of shortage or discontinuation of use, comprising:
    a first series of steps for pretreating said scrap, including:
        pelletizing (20) and sintering (21) of the scrap, said scrap being in the form of powder, in order to form a first set of scrap pellets, and
        micronization (23) of the first set of scrap pellets in order to form micronized scrap powder; and
    a second series of steps for manufacturing $(U,Pu)O_2$ mixed oxide fuel pellets, including:
        a dispensing and a first blending (1) of at least a portion of the micronized powder scraps and, if required, of $PuO_2$ and/or $UO_2$ powders, to form a first blend:
        micronization (2) and forced sieving (3) of the first blend,
        another dispensing and a second blending (4) of the first sieved blend, of $UO_2$ powders and, if required, of a further portion of the micronized scrap powder, to form a second blend,
        pelletizing (6) of the second blend to form pellets, and
        sintering (7) of the pellets, to form sintered pellets.

2. The process as claimed in claim 1, in which said first series of steps further includes crushing (22) of the first set of scrap pellets before their micronization.

3. The process as claimed in claim 1, wherein scrapped unsintered powders and/or powders arising from grinding (8) of fuel pellets in said second series of steps are taken as said scrap in said first series of steps.

4. The process as claimed in claim 1, wherein a second set of scrap pellets, arising from sorting (9) of fuel pellets in said second series of steps undergo the same pretreatment process as the first set of scrap pellets for the purpose of recycling them.

5. The process as claimed in claim 4, wherein unirradiated $(U,Pu)O_2$ mixed-oxide nuclear fuel pellets, possibly produced by different manufacturing processes and scrapped, are used as a third set of pellets, said third set of pellets undergoing the same pretreatment process as the first set of scrap pellets for the purpose of recycling them.

6. The process as claimed in claim 5, wherein up to 40% of scrap, with respect to the net production, is incorporated into the aforementioned process for manufacturing fuel pellets.

7. The process as claimed in claim 6, wherein up to 100% of scrap is incorporated into said first blend (1).

8. The process as claimed in claim 1, wherein a proportion of 99.5%, expressed as mass of $PuO_2$, of the scraps from the aforementioned process for manufacturing fuel pellets is dry-recycled.

9. The process as claimed in claim 1, wherein a ball milling process is used for the micronization (2,23) of the first blend and/or of the scrap pellets.

10. The process as claimed in claim 1, wherein a lubricant is added before pelletizing (6 and 20).

11. The process as claimed in claim 10, wherein zinc-stearate is used as the lubricant.

12. The process as claimed in claim 1, wherein scraps and/or $UO_2$ and $PuO_2$ oxide powders are recovered during the process or transfer operations by means of cleanable filters, so as to recycle them into scrap pellets at the pelletizing (20) and sintering (21) steps.

13. The process as claimed claim 1, wherein the fuel pellets containing scraps and/or the scrap pellets are sintered (7, 21) in an argon and hydrogen atmosphere, at a temperature of between 1670 and 1760° C.

14. The process as claimed in claim 1, wherein, during sintering (7, 21), the partial pressure of oxygen $p_{O2}$ is adjusted, by humidification, in order to improve the interdiffusion of the $PuO_2$ and $UO_2$ oxides.

* * * * *